(12) United States Patent
Shen et al.

(10) Patent No.: US 10,133,596 B2
(45) Date of Patent: Nov. 20, 2018

(54) SYSTEM AND METHOD FOR SUPPORTING APPLICATION INTEROPERATION IN A TRANSACTIONAL MIDDLEWARE ENVIRONMENT

(71) Applicant: Oracle International Corporation, Redwood Shores, CA (US)

(72) Inventors: Xugang Shen, Beijing (CN); Qingsheng Zhang, Beijing (CN); Todd J. Little, Palatine, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 230 days.

(21) Appl. No.: 13/829,246

(22) Filed: Mar. 14, 2013

(65) Prior Publication Data

US 2013/0246379 A1    Sep. 19, 2013

Related U.S. Application Data

(60) Provisional application No. 61/612,144, filed on Mar. 16, 2012.

(51) Int. Cl.
*G06F 17/30* (2006.01)
*G06F 9/46* (2006.01)
(Continued)

(52) U.S. Cl.
CPC ............ *G06F 9/466* (2013.01); *G06F 3/0659* (2013.01); *G06F 9/544* (2013.01); *G06F 9/546* (2013.01);
(Continued)

(58) Field of Classification Search
None
See application file for complete search history.

(56) References Cited

U.S. PATENT DOCUMENTS 5,261,089 A    11/1993   Coleman et al.
5,452,445 A    9/1995    Hallmark et al.
(Continued)

FOREIGN PATENT DOCUMENTS

| CN | 101438248 A | 5/2009 |
|---|---|---|
| CN | 102203779 A | 9/2011 |
| CN | 102317913 A | 1/2012 |

OTHER PUBLICATIONS

Hirotaka Taruzawa, Takakiyo Tanaka, Aim! J2EE Architect Mission Critical Systems Development Course, Monthly Java World, Japan, Tokyo: IDG Japan, Apr. 1, 2005, vol. 9 No. 4 (Serial No. 95), pp. 130-141.

(Continued)

*Primary Examiner* — Usmaan Saeed
*Assistant Examiner* — Yu Zhao
(74) *Attorney, Agent, or Firm* — Tucker Ellis LLP

(57) ABSTRACT

A system and method can support application interoperation in a transactional middleware environment. A first transaction server operates to initiate a global transaction, wherein the first transaction server that is associated with a first format identifier (ID), and wherein the global transaction includes a plurality of branches and each said branch is associated with an individual branch qualifier. Furthermore, the first transaction server can direct at least one branch of the global transaction from the first transaction server to a second transactional server, wherein each said transactional server is associated with a second format identifier (ID), and configure a plurality of branches in the global transaction to share a common format identifier (ID).

16 Claims, 10 Drawing Sheets

(51) Int. Cl.
  *G06F 9/54* (2006.01)
  *G06F 15/167* (2006.01)
  *H04L 29/08* (2006.01)
  *G06F 3/06* (2006.01)

(52) U.S. Cl.
  CPC ...... *G06F 15/167* (2013.01); *G06F 17/30289* (2013.01); *H04L 67/02* (2013.01); *H04L 67/10* (2013.01)

(56) References Cited

U.S. PATENT DOCUMENTS

| | | | |
|---|---|---|---|
| 5,555,396 A | | 9/1996 | Alferness et al. |
| 5,617,537 A | | 4/1997 | Yamada et al. |
| 5,652,885 A | | 7/1997 | Reed |
| 5,680,610 A | | 10/1997 | Smith |
| 5,790,789 A | * | 8/1998 | Suarez ............... G06F 9/5055 709/202 |
| 6,070,202 A | | 5/2000 | Minkoff et al. |
| 6,154,847 A | | 11/2000 | Schofield et al. |
| 6,247,023 B1 | | 6/2001 | Hsiao |
| 6,295,548 B1 | * | 9/2001 | Klein ............... G06F 9/466 707/999.01 |
| 6,374,243 B1 | | 4/2002 | Kobayashi |
| 6,470,342 B1 | | 10/2002 | Gondi et al. |
| 6,629,153 B1 | | 9/2003 | Gupta |
| 6,754,842 B2 | | 6/2004 | Kettley et al. |
| 7,103,597 B2 | | 9/2006 | McGoveran |
| 7,284,018 B1 | | 10/2007 | Waldorf |
| 7,380,155 B2 | | 5/2008 | Fung et al. |
| 7,430,740 B1 | | 9/2008 | Molloy et al. |
| 7,694,178 B2 | | 4/2010 | Hobson |
| 7,725,446 B2 | | 5/2010 | Huras |
| 7,743,036 B2 | | 6/2010 | Cotner et al. |
| 7,822,727 B1 | | 10/2010 | Shaughnessy |
| 7,913,261 B2 | | 3/2011 | Mitchell et al. |
| 7,970,737 B2 | | 6/2011 | Parkinson |
| 8,671,085 B2 | | 3/2014 | Dhamankar et al. |
| 8,738,964 B2 | | 5/2014 | Markus |
| 8,868,506 B1 | | 10/2014 | Bhargava et al. |
| 9,146,944 B2 | | 9/2015 | Parkinson |
| 2001/0047436 A1 | | 11/2001 | Sexton et al. |
| 2002/0023129 A1 | | 2/2002 | Hsiao et al. |
| 2002/0116568 A1 | | 8/2002 | Oksanen |
| 2002/0144006 A1 | | 10/2002 | Cranston et al. |
| 2003/0005172 A1 | * | 1/2003 | Chessell ............... 709/316 |
| 2003/0035372 A1 | | 2/2003 | Schaub |
| 2003/0154423 A1 | | 8/2003 | Egolf |
| 2004/0015079 A1 | | 1/2004 | Berger et al. |
| 2004/0123293 A1 | | 6/2004 | Johnson |
| 2004/0153349 A1 | | 8/2004 | K et al. |
| 2004/0153450 A1 | * | 8/2004 | K. et al. ............... 707/8 |
| 2004/0158549 A1 | | 8/2004 | Matena et al. |
| 2005/0044551 A1 | | 2/2005 | Sodhi |
| 2005/0144171 A1 | * | 6/2005 | Robinson ............... 707/9 |
| 2005/0144299 A1 | | 6/2005 | Blevins |
| 2005/0182795 A1 | | 8/2005 | Murthy |
| 2005/0262055 A1 | | 11/2005 | Newport |
| 2005/0262077 A1 | | 11/2005 | Barnes |
| 2006/0010026 A1 | * | 1/2006 | Nenov ............... G06Q 10/06 719/311 |
| 2006/0075277 A1 | | 4/2006 | Johnson et al. |
| 2006/0080668 A1 | | 4/2006 | Blackmore et al. |
| 2006/0136887 A1 | | 6/2006 | Kaczynski et al. |
| 2006/0149791 A1 | | 7/2006 | Sinha et al. |
| 2006/0179125 A1 | * | 8/2006 | Pavlik et al. ............... 709/219 |
| 2006/0235853 A1 | | 10/2006 | Luo |
| 2007/0041392 A1 | | 2/2007 | Kunze et al. |
| 2007/0079077 A1 | | 4/2007 | Baines et al. |
| 2007/0156729 A1 | | 7/2007 | Shaylor |
| 2007/0165625 A1 | | 7/2007 | Eisner |
| 2008/0127219 A1 | * | 5/2008 | Lacombe et al. ............... 719/318 |
| 2008/0147945 A1 | | 6/2008 | Zimmer |
| 2008/0177955 A1 | | 7/2008 | Su |
| 2008/0243865 A1 | | 10/2008 | Hu et al. |
| 2008/0250074 A1 | | 10/2008 | Parkinson |
| 2008/0307088 A1 | * | 12/2008 | Chen ............... G06F 11/3495 709/224 |
| 2009/0070330 A1 | | 3/2009 | Hwang et al. |
| 2009/0158397 A1 | | 6/2009 | Herzog et al. |
| 2009/0172153 A1 | | 7/2009 | Cohen |
| 2009/0248765 A1 | | 10/2009 | Akidau et al. |
| 2009/0292744 A1 | | 11/2009 | Matsumura |
| 2010/0042999 A1 | | 2/2010 | Dorai et al. |
| 2010/0169284 A1 | | 7/2010 | Walter et al. |
| 2010/0198920 A1 | | 8/2010 | Wong et al. |
| 2011/0055313 A1 | | 3/2011 | Little |
| 2011/0087633 A1 | | 4/2011 | Kreuder et al. |
| 2011/0145204 A1 | | 6/2011 | Maple et al. |
| 2012/0084274 A1 | | 4/2012 | Renkes et al. |
| 2012/0131285 A1 | | 5/2012 | Leshchiner et al. |
| 2012/0166889 A1 | | 6/2012 | El-Kersh et al. |
| 2012/0210094 A1 | | 8/2012 | Blocksome et al. |
| 2013/0066949 A1 | | 3/2013 | Colrain |

OTHER PUBLICATIONS

Yoshihiro Iwamiya, Shigeru Urushibara, 3. Art to Support Distributed Transaction Processing, Basic Knowledge 4 for SE, Distributed-Transaction Processing 1st Edition, Tokyo: Co. Ltd. Ric Telecom, Apr. 20, 1994, 1st Edition, pp. 84-91, 228, 262-263, ISBN4-89797-056-3.

State Intellectual Property Office of the People's Republic of China, Office Action dated Dec. 26, 2016 for Chinese Patent Application No. 20138000805.7, 12 Pages.

IBM, IBM® DB2 Universal Database™ Administration Guide: Performance Version 8, © Copyright International Business Machines Corporation 1993-2002, Entire Book. download on Jan. 20, 2017 from: <ftp://ftp.software.ibm.com/ps/products/db2/info/vr8/pdf/letter/db2d3e80.pdf>.

State Intellectual Property Office of the People's Republic of China, Office Action dated Dec. 23, 2016 for Chinese Patent Application No. 201380008047.6, 10 Pages.

Oracle, "Using GTRID Mapping in Transactions", e-docs.bea.com The BEA Documentation Source BEA Tuxedo Release 7.1, 2000.

Fernando de Ferreira Rezende et al., "Implementing Identifiers for Nested Transactions", Proc. of the 16th Brazilian Computer Society Conference and 23rd Integrated Seminar on Software and Hardware (SBC-SEMISH '96), Recfe, Brazil, Aug. 1996, pp. 119-130.

Oracle, "Oracle9i Database Administrator's Guide Release 1 (9.0.1) Part No. A90117-01" Copyright © 1996-2001 Oracle Corporation.

* cited by examiner

SYSTEM AND METHOD FOR SUPPORTING APPLICATION INTEROPERATION IN A TRANSACTIONAL MIDDLEWARE ENVIRONMENT

CLAIM OF PRIORITY

This application claims priority on U.S. Provisional Patent Application No. 61/612,144, entitled "SYSTEM AND METHOD FOR PROVIDING DISTRIBUTED TRANSACTION PROCESSOR DATABASE AFFINITY AND DISTRIBUTED TRANSACTION PROCESS OPTIMIZATION," by inventors Todd Little, Edward A. Heeren, Paul Parkinson, Carol L. Colrain, Nancy Ikeda, Peizhi Shi, Right Lv, Jim Jin and Xugang Shen, filed Mar. 16, 2012, which application is herein incorporated by reference.

CROSS REFERENCE TO RELATED APPLICATIONS

This application is related to the following patent applications, each of which is hereby incorporated by reference in its entirety:

U.S. patent application entitled "SYSTEM AND METHOD FOR SUPPORTING READ-ONLY OPTIMIZATION IN A TRANSACTIONAL MIDDLEWARE ENVIRONMENT", application Ser. No. 13/828,906, filed Mar. 14, 2013; and U.S. patent application entitled "SYSTEM AND METHOD FOR SHARING GLOBAL TRANSACTION IDENTIFIER (GTRID) IN A TRANSACTIONAL MIDDLEWARE ENVIRONMENT", application Ser. No. 13/829,176, filed Mar. 14, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to transactional middleware.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Systems and methods are provided for supporting application interoperation in a transactional middleware environment. A first transaction server operates to initiate a global transaction, wherein the first transaction server that is associated with a first format identifier (ID), and wherein the global transaction includes a plurality of branches and each said branch is associated with an individual branch qualifier. Furthermore, the first transaction server can direct at least one branch of the global transaction from the first transaction server to a second transactional server, wherein each said transactional server is associated with a second format identifier (ID), and configure a plurality of branches in the global transaction to share a common format identifier (ID).

Other objects and advantages of the present invention will become apparent to those skilled in the art from the following detailed description of the various embodiments, when read in light of the accompanying drawings.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the OracleTuxedo® environment as an example for a transactional middleware machine environment. It will be apparent to those skilled in the art that other types of transactional middleware machine environments can be used without limitation.

Described herein are systems and methods that can support read-only optimization in a transactional middleware environment.

Global Transaction

In accordance with various embodiments of the invention, a transactional system can support a global transaction, which can be executed on more than one server, and is capable of accessing data from more than one resource manager.

A global transaction can be treated as a specific sequence of operations that are characterized by the four properties of atomicity, consistency, isolation, and durability (ACID). The global transaction can be a logical unit of work that has the following features:

All portions either succeed or have no effect.
Operations are performed that correctly transform the resources from one consistent state to another.
Intermediate results are not accessible to other transactions, although other processes in the same transaction may access the data.
All effects of a completed sequence cannot be altered by any kind of failure.

Furthermore, a global transaction may include several local transactions, each accessing a single resource manager. A local transaction can access a single database or file and can be controlled by the resource manager responsible for performing concurrency control and atomicity of updates at that distinct database. A given local transaction may be either successful or unsuccessful in completing its access.

Figure 1:
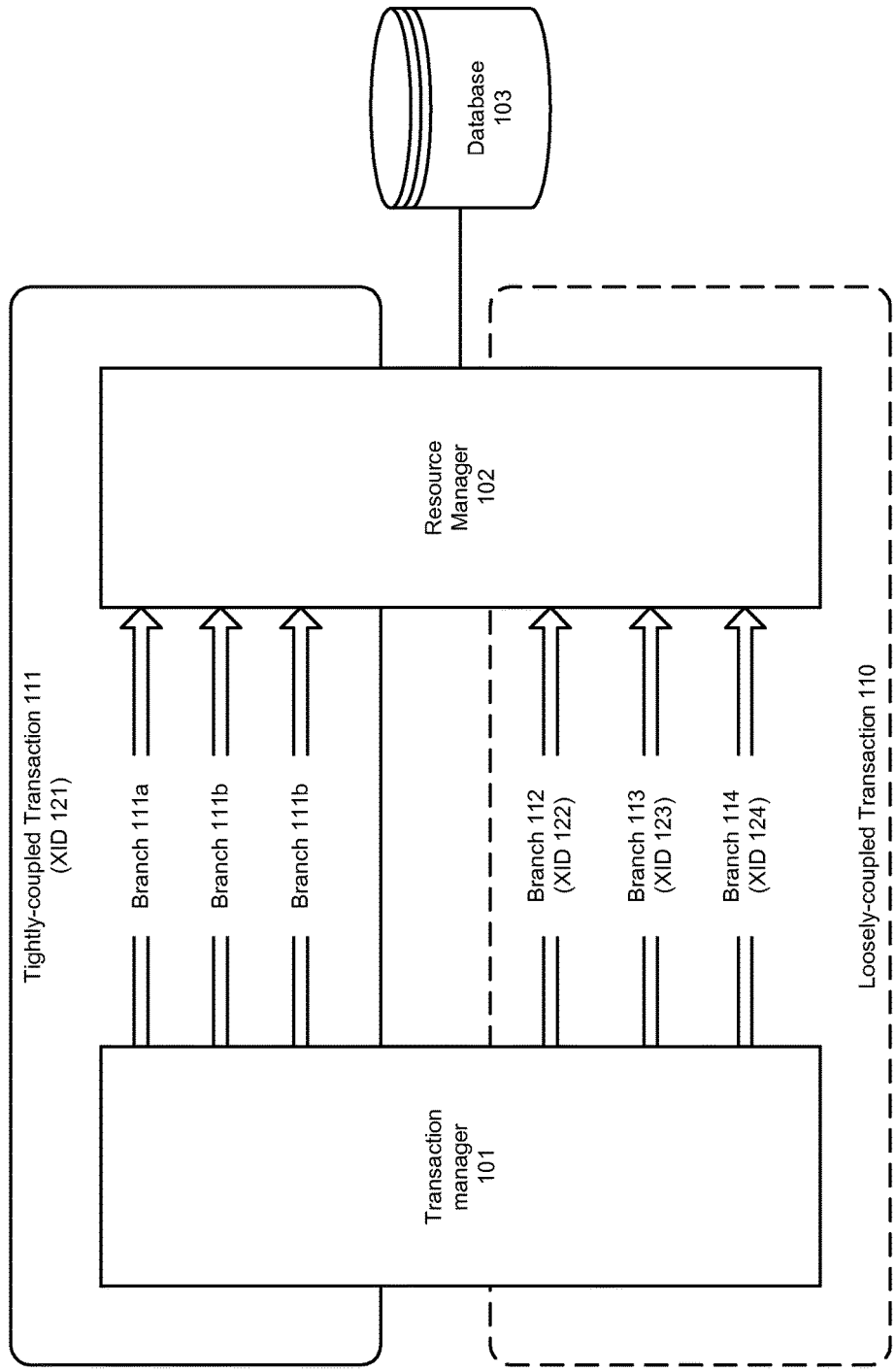
FIG. 1 shows an illustration of supporting different types of transactions in a transactional middleware machine environment, in accordance with an embodiment of the invention.

FIG. 1 shows an illustration of supporting different types of transactions in a transactional middleware machine environment, in accordance with an embodiment of the invention. As shown in FIG. 1, a transactional environment 100 can include a transaction manager (TM) 101, a resource manager (RM) 102, and a database 103.

Furthermore, the transactional environment 100 can support one or more transactions. Using the Open Group Distributed Transaction Processing (DTP) Model, the transaction manager (TM) 101 can construct transaction trees for various transactions with either tightly-coupled or loosely-coupled relationships with a resource manager (RM) 102. The coupling of the relationships can be determined in the way that the local services are defined, e.g. in the DMCONFIG file for the Oracle Tuxedo system.

As shown in FIG. 1, the transaction Manager (TM) can define either a tightly-coupled transaction 111 or a loosely-coupled transaction 110 in the transactional environment 100.

The tightly-coupled transaction 111 can include a plurality of transaction branches, e.g. branches 111a-111c, each of which can have the same transaction identifier (XID) 121. The common XID 121 can be used by all processes participating in the same global transaction 111 and accessing the same resource manager (RM) 102.

This tightly-coupled relationship can maximize data sharing between processes. For example, XA-compliant RMs can share locks for resources used by processes having the same XID. Additionally, the Tuxedo system can achieve the tightly-coupled relationship through the group concept. In Tuxedo, the work done by a group on behalf of a given global transaction belongs to the same transaction branch, and all the processes can be given with the same XID.

On the other hand, the loosely-coupled transaction 110 can include a plurality of transaction branches, e.g. branches 112-114, each of which can have a different transaction identifier (XID). As shown in FIG. 1, branch 112 can have a XID 122, branch 113 can have a XID 123, and branch 114 can have a XID 124.

The TM 101 can generate a transaction branch for each part of the work in support of the global transaction. For example, a loosely-coupled relationship can be created in the Tuxedo system when each group participating in the same global transaction defines a transaction branch.

The resource manager (RM) 102 can handle each transaction branch in the loosely-coupled transaction 110 separately, and there is no sharing of data or of locks between the transaction branches. Furthermore, deadlocks, which may result in the rollback of the global transaction, can occur between the transaction branches in the loosely-coupled transaction 110.

Two-Phase Commit (2PC)

A two-phase-commit (2PC) protocol can be used to execute a transaction, such as a loosely-coupled global transaction. The two-phase-commit protocol (2PC) can include a prepare phase and a commit phase. In the prepare phase, a coordinating transaction manager (TM) instructs the participating resource managers (RMs) to take the necessary steps for either committing or aborting the transaction. In the commit phase, the transaction manager (TM) decides whether to commit or abort the transaction, based on the results of the prepare phase.

Figure 2:
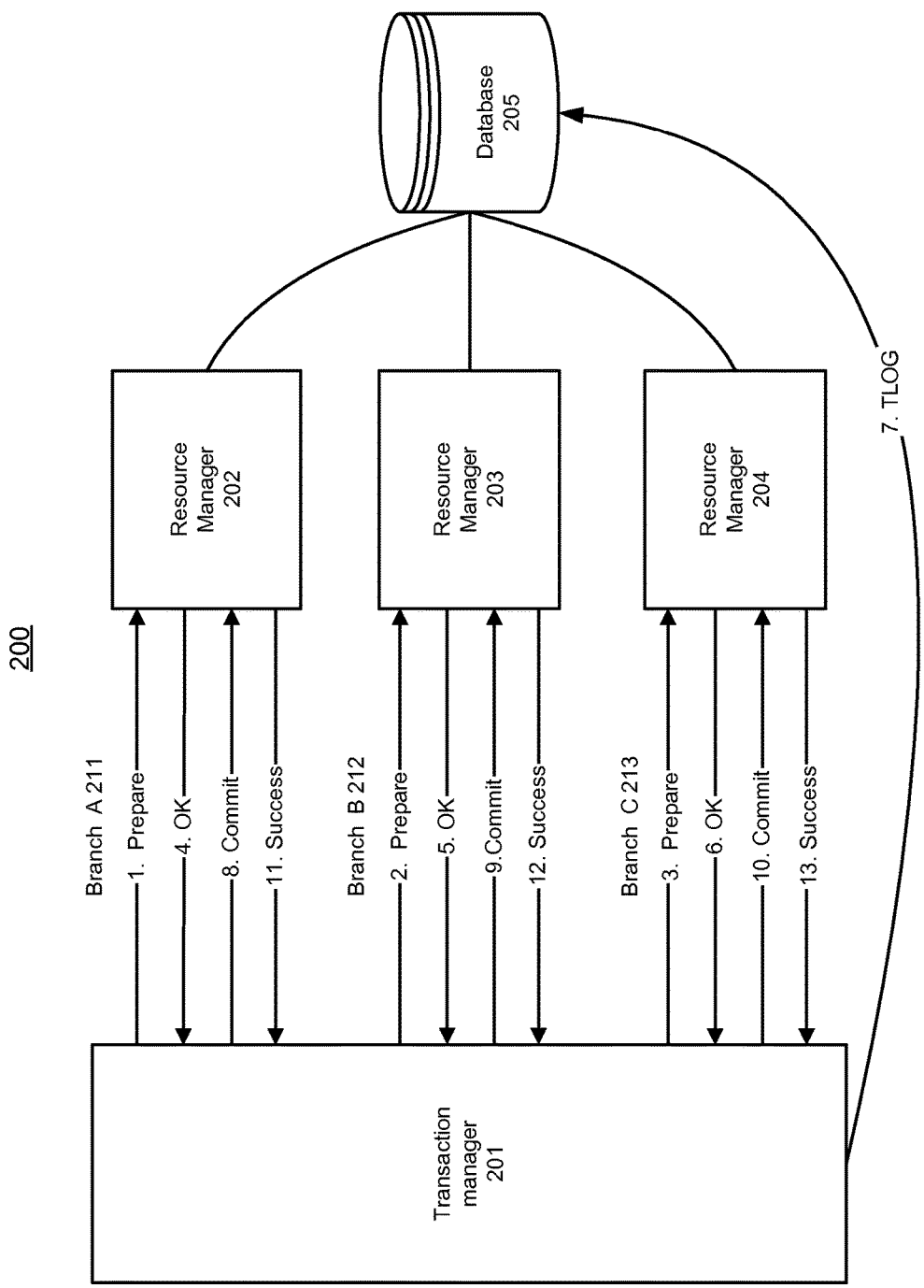
FIG. 2 shows an illustration of supporting two-phase commit in a transactional middleware machine environment.

FIG. 2 shows an illustration of supporting two-phase commit in a transactional middleware machine environment. As shown in FIG. 2, a transactional environment 200 can include a transaction manager 201 that supports the execution of various transactions, and one or more resource managers 202-204 that manage one or more data source, e.g. a database 205.

For example, the transaction manager 201 can execute a transaction that involves transaction branch A 211, transaction branch B 212, and transaction branch C 213, each of which can be executed against a resource manager 202-204 respectively. If any branch fails in the transaction, the transaction manager 201 can help the resource manager 202-204 decide whether to commit, or roll back, the transaction.

As shown in FIG. 2, the transaction manager 201 can send a prepare instruction to the resource manager 202-204 on all three branches (steps 1, 2, and 3). After the resource managers 202-204 return an "OK" vote (steps 4, 5 and 6), the transaction manager 201 can write a transaction log to the database 205 (step 7).

The transaction log (TLOG) may be written either to files, or to a database, so that the transaction manager 201 can have enough information to recover the transaction if any branch fails during the commit phase.

Then, the transaction manager 201 can instruct the resource manager 202-204 to commit all three branches (steps 8, 9 and 10). The resource manager 202-204 can inform the transaction manager 201 after successfully completing the commit phase (steps 11, 12 and 13).

Read-Only Optimization

In accordance with an embodiment of the invention, a read-only optimization can be used to improve the performance of a transactional system without sacrificing the ACID properties of the transaction. The read-only optimization can reduce the phases involved in executing a transaction and can eliminate the transaction log(TLOG).

Figure 3:
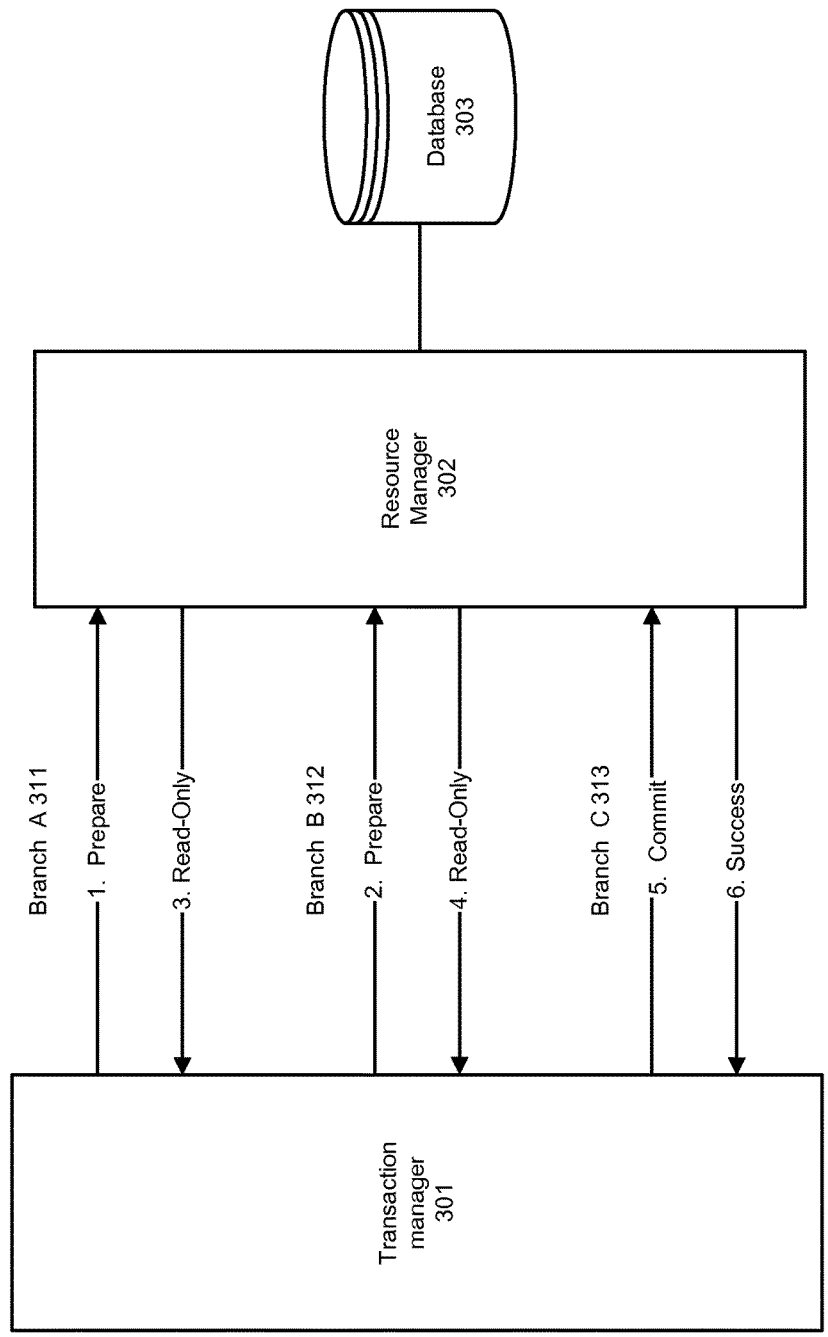
FIG. 3 shows an illustration of supporting read-only optimization in a transactional middleware machine environment, in accordance with an embodiment of the invention.

FIG. 3 shows an illustration of supporting read-only optimization in a transactional middleware machine environment, in accordance with an embodiment of the invention. As shown in FIG. 3, a transactional environment 300 can include a transaction manager (TM) 301, a resource manager (RM) 302, and a database 303

The transaction manager 301 can execute a transaction that involves transaction branch A 311, transaction branch B 312, and transaction branch C 313, each of which can be executed against a resource manager 302 that manage one or more data source, e.g. a database 303.

In accordance with an embodiment of the invention, using the read-only optimization, the transaction manager 301 can withhold one branch during the prepare phase. As shown in FIG. 3, the transaction manager 301 can invoke a prepare operation on the branches A-B 311-312 of the transaction with the branch C 313 on hold (steps 1-2).

The transaction manager 301 can randomly pick a branch form the branches A-C 311-313 to hold. Alternatively, the transaction manager 301 can decide to hold a branch that can perform the fastest execution.

Furthermore, when each of these transaction branches A-B 311-312 returns a "Read-Only" vote (steps 3-4), the transaction manager 301 can invoke a commit operation on the branch C 313 directly (step 5), without invoking a prepare operation and/or writing a TLOG.

The "Read-Only" vote returned by the resource manager 302 indicates that no data on the branches has been modified. The transaction manager 301 can safely assume that the branches A-B 311-312 are completed and that no commit operations on the branches are necessary for this transaction.

Additionally, the transaction manager 301 can save a state of the branch C 313 to the database 303 while committing the branch C 313 (step 5). Thus, if the commit fails, the transaction manager 301 can recover the transaction by rolling back the branch C 313.

Using the read-only optimization, the system can improve the performance of a transaction by eliminating the TLOG. Furthermore, as shown in FIG. 3, the system can save a commit operation on the branches A-B 311-312, and a prepare operation on the branch C 313.

Many Tuxedo applications uses on-line transaction process (OLTP), which runs on the same RM (one instance or more) and can taking advantage of the read-only optimization in a database, such as an Oracle Database. For a global transaction involving more than one Tuxedo group, Tuxedo can automatically hold one transaction branch which can be performed the fastest and do prepare stage on the other branches. If, and only if, all the other branches return a Read-only vote, Tuxedo can perform a commit operation directly on the branch on hold, without writing a TLOG and performing a prepare operation.

Figure 4:
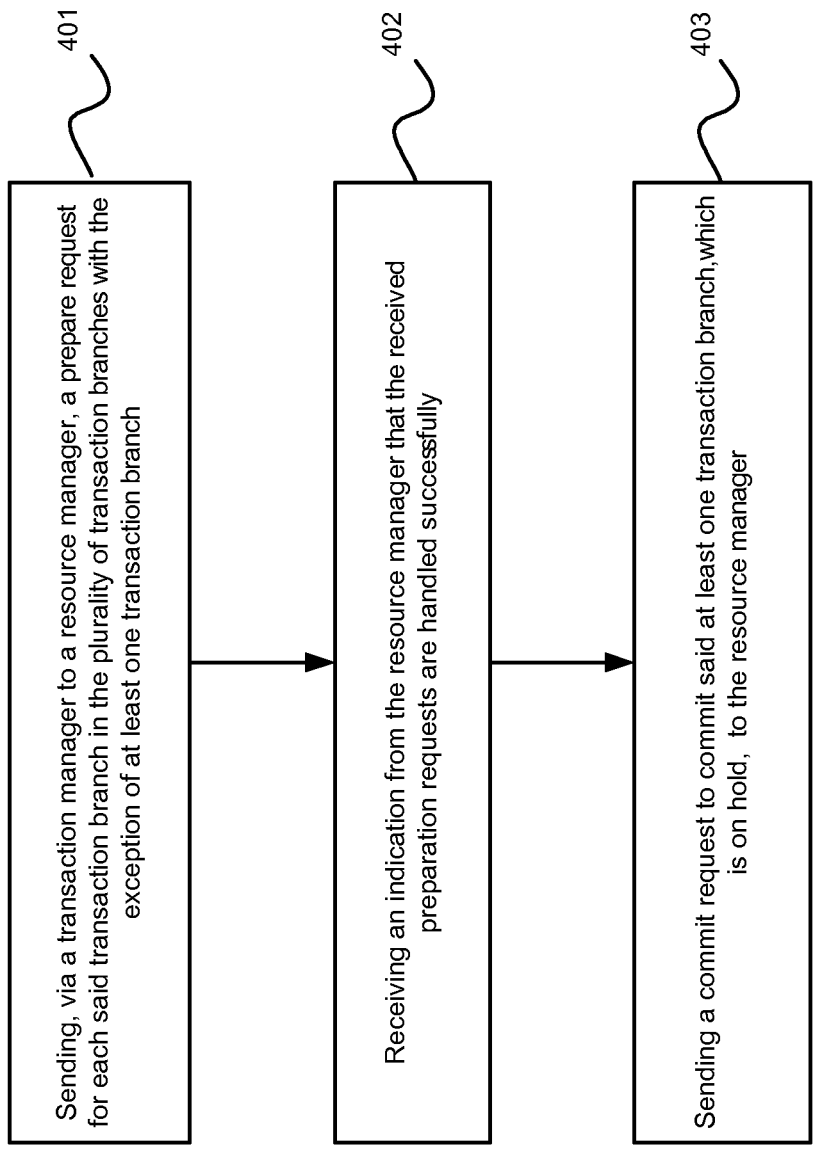
FIG. 4 illustrates an exemplary flow chart for supporting read-only optimization in a transactional middleware machine environment, in accordance with an embodiment of the invention.

FIG. 4 illustrates an exemplary flow chart for supporting read-only optimization in a transactional middleware machine environment, in accordance with an embodiment of the invention. As shown in FIG. 4, at step 401, a transaction manager can send, to a resource manager, a prepare request for each said transaction branch in the plurality of transaction branches with the exception of at least one transaction branch. Then, at step 402, the transaction manager can receive an indication from the resource manager that the received preparation requests are handled successfully. Furthermore, at step 403, the transaction manager can send a commit request to the resource manager to commit the at least one transaction branch, which is on hold.

Figure 5:
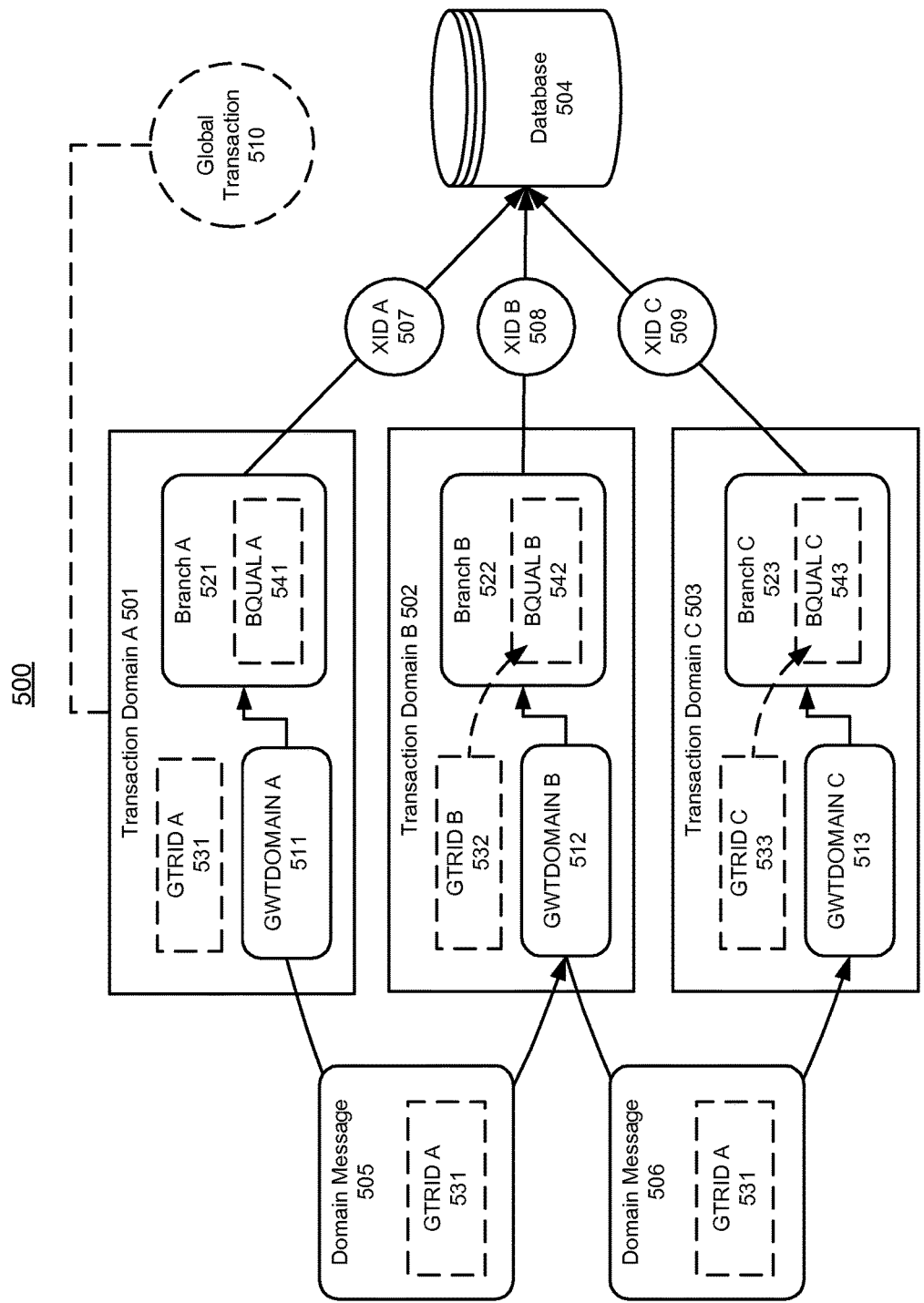
FIG. 5 shows an illustration of sharing common global transaction identifier (GTRID) across multiple transaction domains in a transactional middleware machine environment, in accordance with an embodiment of the invention.

Common Global Transaction Identifier (GTRID) Across Multiple Transaction Domains FIG. 5 shows an illustration of sharing common global transaction identifier (GTRID) across multiple transaction domains in a transactional middleware machine environment, in accordance with an embodiment of the invention. As shown in FIG. 5, a global transaction 510 in the transactional middleware machine environment 500 can include a plurality of branches, e.g. branches A-C 521-523, each of which can be associated with a branch qualifier (BQUAL), e.g. BQUALs A-C 541-543.

The global transaction 510 can span across multiple transaction domains A-C 501-503, each of which can be associated with a separate global transaction identifier (GTRID). For example, GTRID A 531 is associated with the branch A 521 in the transaction domain A 501, GTRID B 532 is associated with the branch B 522 in the transaction domain B 502, and GTRID C 533 is associated with the branch C 523 in the transaction domain C 503.

Furthermore, a database 504 can be used to store various types of transactional information in the global transaction 510. In order to support the interaction with the database 504 (or an associated resource manager), the system can generate a transaction identifier (XID) for each branch in the global transaction 510. For example, the system can generate XID A 507 for branch A 521, XID B 508 for branch A 522, and XID C 509 for branch C 523. Each transaction identifier (XID) can include a global transaction identifier (GTRID) and a branch qualifier, and a format identifier (which will be discussed in the following sections).

In accordance with an embodiment of the invention, a "tightly-coupled relationship" can be established for the global transaction 510, where a common global transaction identifier (GTRID) and can be used by all processes or branches for both participating in the global transaction 510 and accessing the same resource manager. The tightly-coupled relationship can maximizes data sharing between the processes. In the example of Tuxedo, a tightly-coupling relationship can be achieved via the group concept. The work done by a group on behalf of a given global transaction belongs to the same transaction branch with all the processes are given the same XID.

In the example as shown in FIG. 5, GTRID A 531 can be chosen as the common global transaction identifier (GTRID), in the case when the transaction domain A 501 is the owner or initiator of the global transaction 510. Furthermore, GTRID A 531 can be sent from the transaction domain A 501 to other domains, such as transaction domains B-C 502-503, in order to establish the tightly-coupled relationship.

Additionally, the transaction identifiers (XIDs) A-C 507-509 can be generated to include GTRID A 531, in order to support the performance of the global transaction 510 on the database 504. Thus, the database 504 can identify the different branches A-C 521-523 in the global transaction 510 based on GTRID A 531, the common global transaction identifier (GTRID).

In accordance with an embodiment of the invention, a composite branch qualifier can be included in a generated transaction identifier (XID) to support the recovery of the global transaction 510 when it fails. For example, XID B 508 can include a composite branch qualifier that includes both BQUAL B 542 and GTRID B 532. Similarly, XID C 509 can include a composite branch qualifier that includes both BQUAL C 543 and GTRID C 533.

In accordance with an embodiment of the invention, the owner of the global transaction 510, e.g. domain A 501, can be configured to either enable or disable the use of the common global transaction identifier (GTRID), e.g. GTRID A 531. Then, domains B-C 502-503 can use GTRIDs B-C 532-533 instead of the Common GTRID A 531 for performing the global transaction 510. Accordingly, the transaction branches of the global transaction 510 are in loosely-coupled relationship and a two-phase commit can be used in processing the transaction.

Also as shown in FIG. 5, each transaction domain A-C 501-503 can include a gateway server, e.g. GWTDOMAINs A-C 511-513. These gateway servers 511-513 can be use to send or receive one or more domain messages 505-506, which can be used to propagate the common global transaction identifier (ID), GTRID A 531.

In the example of Tuxedo, a local TDomain can send out its GTRID, used on the resource manager, as an imported XID to a remote TDomain, via META_TCM. Additionally, the remote TDomain can check the imported XID in META_TCM. The XA operations on this global transaction in receiving TDomain use this imported GTRID, not the local GTRID, on the resource manager. Thus, the different branches of the transaction on these TDomains can be tightly coupled and the read-only optimization can be supported, when they are performed on same database.

Figure 6:
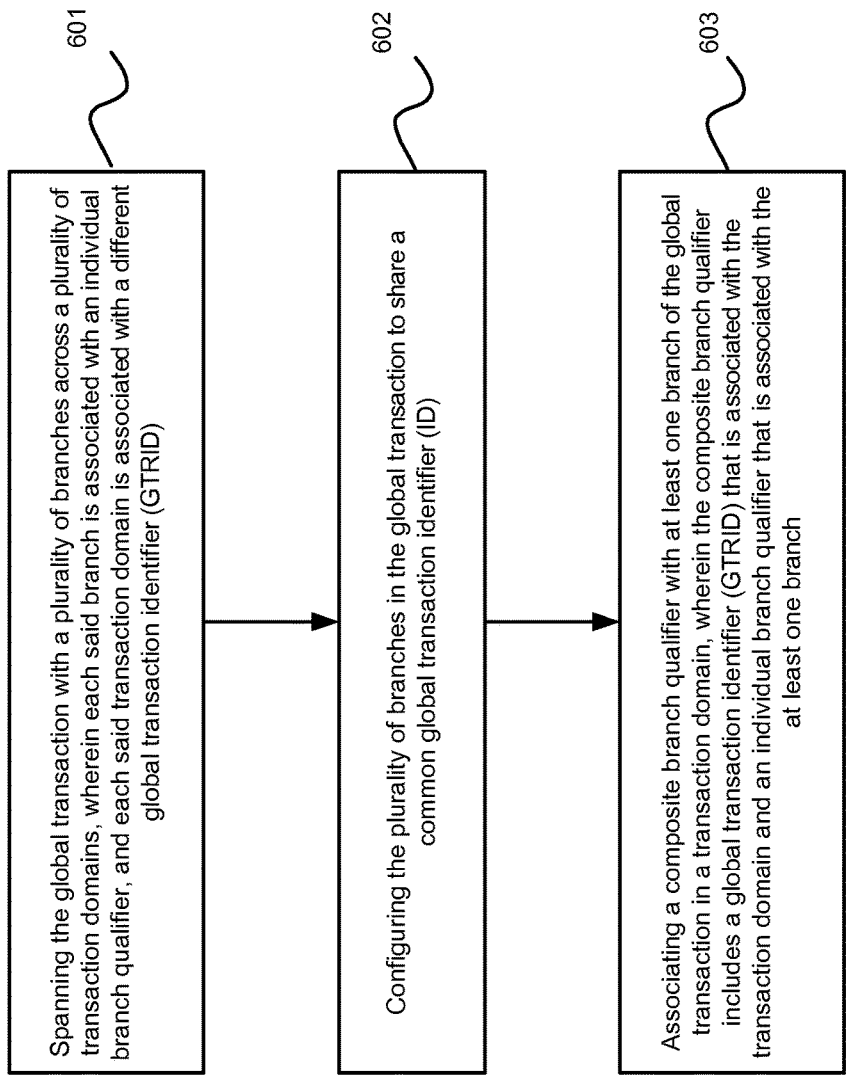
FIG. 6 illustrates an exemplary flow chart for sharing common global transaction identifier (GTRID) across multiple transaction domains in a transactional middleware machine environment, in accordance with an embodiment of the invention.

FIG. 6 illustrates an exemplary flow chart for sharing common global transaction identifier (GTRID) across multiple transaction domains in a transactional middleware machine environment, in accordance with an embodiment of the invention. As shown in FIG. 6, at step 601, the system can span the global transaction with a plurality of branches across a plurality of transaction domains, wherein each said branch is associated with an individual branch qualifier, and each said transaction domain is associated with a different global transaction identifier (GTRID). Then, at step 602, the system can configure the plurality of branches in the global transaction to share a common global transaction identifier (ID). Furthermore, at step 603, the system can associate a composite branch qualifier with at least one branch of the global transaction in a transaction domain, wherein the composite branch qualifier includes a global transaction identifier (GTRID) that is associated with the transaction domain and an individual branch qualifier that is associated with the at least one branch Application Interoperability Between Different Servers In accordance with an embodiment of the invention, format identifiers (FORMATIDs) can be used for providing application interoperability between different servers. For example, the format identifiers (FORMATIDs) can specify which server creates a global transaction identifier (GTRID).

Figure 7:
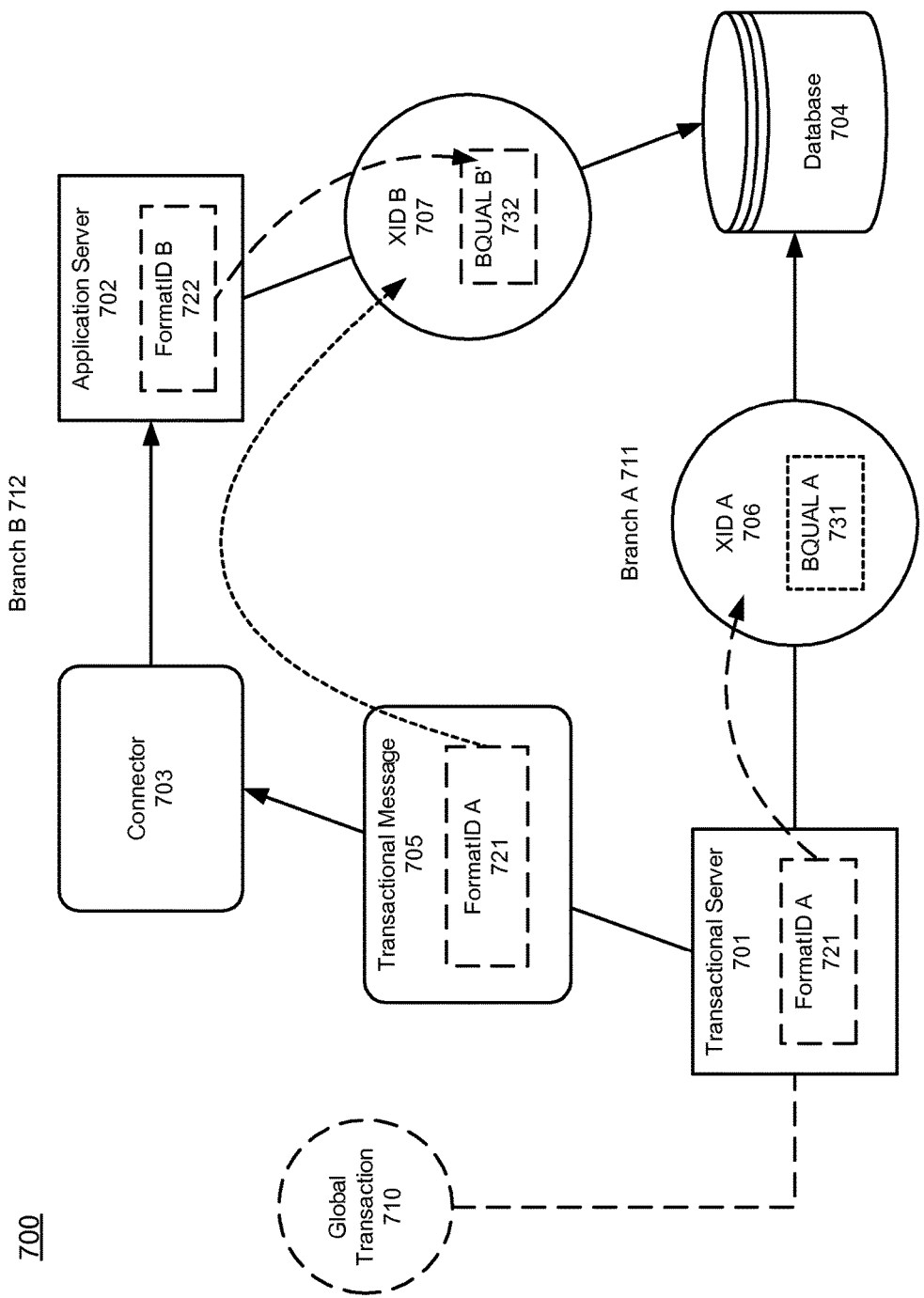
FIG. 7 shows an illustration of providing application interoperability between servers in a transactional middleware machine environment, in accordance with an embodiment of the invention.

FIG. 7 shows an illustration of providing application interoperability between different servers in a transactional middleware machine environment, in accordance with an embodiment of the invention. As shown in FIG. 7, the transactional middleware machine environment 700 can include a plurality of servers, e.g. a transactional server 701 and an application server 702. The transactional server 701 and the application server 702 can be associated with different format identifiers (FORMATIDs), e.g. FORMATID A 721 for the transaction server 701, and FORMATID B 722 for the application server 702.

The transaction server 701 can initiate a global transaction 710 with a plurality of transaction branches, e.g. branches A-B 711-712, each of which can be associated with an individual branch qualifier, e.g. BQUALs A-B 731-732.

Furthermore, both the branches A-B 711-712 can interact with the database 704. The database 704 can recognize each of the branches A-B 711-712 in the global transaction based on a generated transaction identifier (XID). For example, the transactional server 701 can generate the XID A 706 for the branch A 711 and the application server 702 can generate the XID B 707 for the branch B 712.

As shown in FIG. 7, in order to establish the tightly coupled relationship, the branches A-B 711-712 can share a common format identifier (FORMATID), e.g. FORMATID A 721, since the transaction server 701 is the owner of the global transaction 710. Thus, the database 704 can identify tightly-coupled relationship among the branches A-B 711-712 using FORMATID A 721 and a common global transaction identifier (ID), e.g. GTRID A 531 as shown in FIG. 5.

Additionally, the transaction server 701 can direct the branch B 712 to the application server 702, before interacting with the database 704. For example, the transaction server 701 can send the FORMATID A 721 to the application server 702 using a transaction message 705.

In accordance with an embodiment of the invention, a composite branch qualifier can be included in a generated transaction identifier (XID) to support the recovery of the global transaction 710 when it fails. In addition to the original branch qualifiers for the different transaction branches, the composite branch qualifier for branch B 712 can include additional information such as the FORMATID B 722 and related global transaction identifier (GTRID), e.g. GTRID B 532 as shown in FIG. 5.

As shown in FIG. 7, a connector 703 can provide interoperability between the transactional server 701 and the application server 702. The connector 703 can receive an imported FORMATID 721 from the transactional server 701, and provide the imported format ID, FORMATID A 721, to the application server 702.

For example, the WebLogic Tuxedo Connector provides interoperability between WebLogic Server applications and Tuxedo services. The connector allows WebLogic server clients to invoke Tuxedo services and Tuxedo clients to invoke WebLogic Server Enterprise Java Beans (EJBs) in response to a service request. Tuxedo can store its FORMATID into the first four bytes of the branch qualifier in order to let the transaction managers know which branch is owned by the WebLogic Server or Tuxedo server in the recover process.

Figure 8:
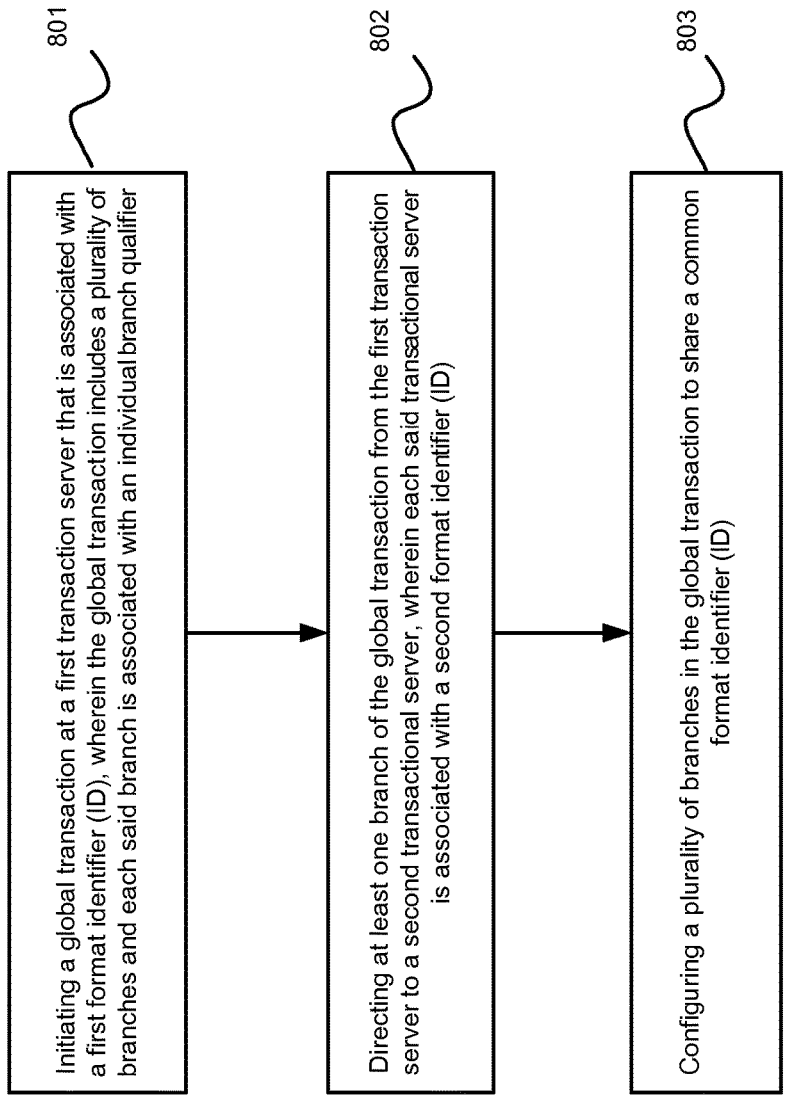
FIG. 8 illustrates an exemplary flow chart for providing application interoperability between servers in a transactional middleware machine environment, in accordance with an embodiment of the invention.

FIG. 8 illustrates an exemplary flow chart for providing application interoperability between servers in a transactional middleware machine environment, in accordance with an embodiment of the invention. As shown in FIG. 8, at step 801, the system can initiate a global transaction at a first transaction server that is associated with a first format identifier (ID), wherein the global transaction includes a plurality of branches and each said branch is associated with an individual branch qualifier. Then, at step 802, the system can direct at least one branch of the global transaction from the first transaction server to a second transactional server, wherein each said transactional server is associated with a second format identifier (ID). Furthermore, at step 803, the system can configure a plurality of branches in the global transaction to share a common format identifier (ID).

The Generating and Recovery of the Transaction Identifiers (XIDs)

Figure 9:
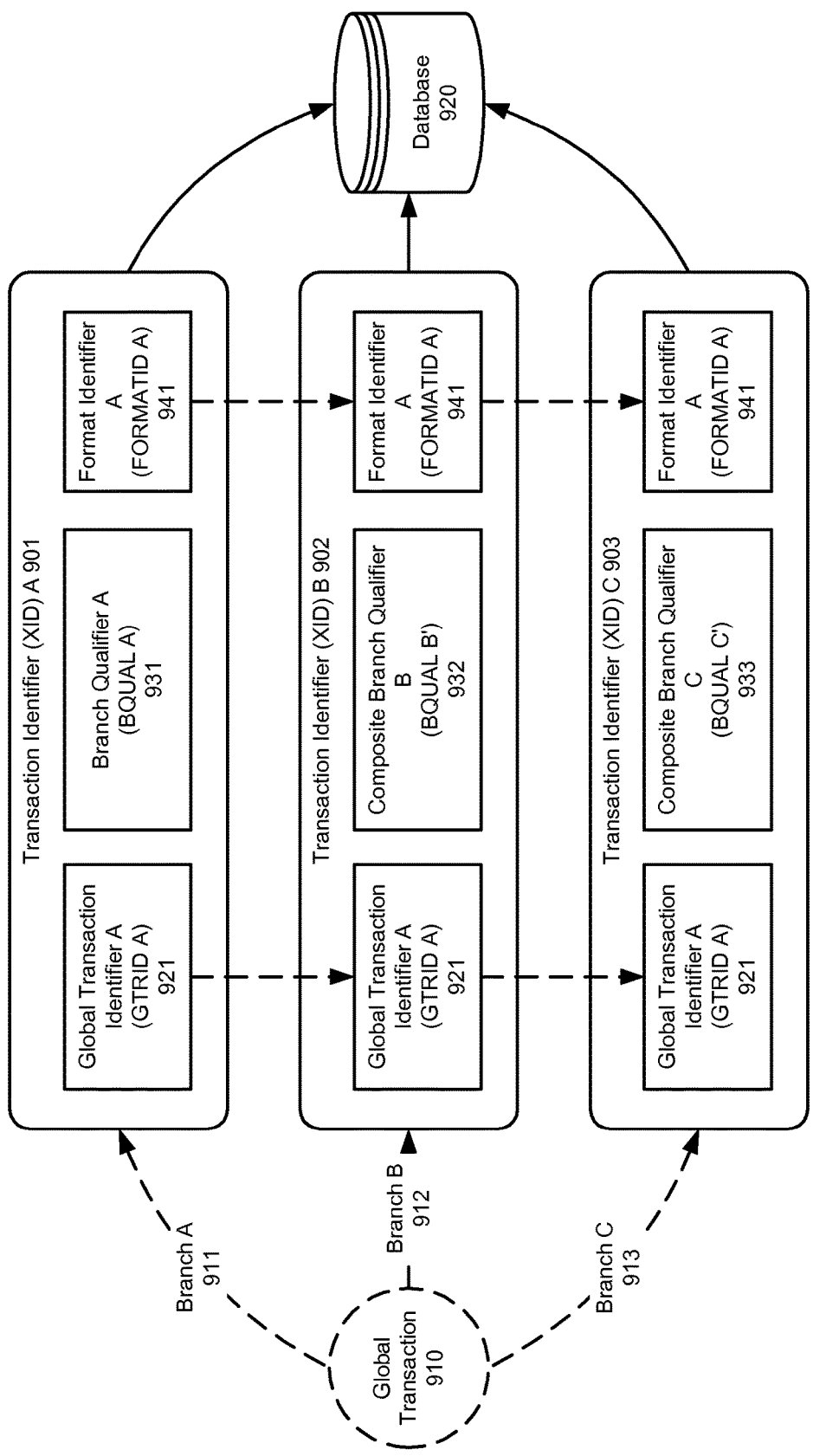
FIG. 9 shows an illustration of generating one or more transaction identifiers (XIDs) in a transactional middleware machine environment, in accordance with an embodiment of the invention.

FIG. 9 shows an illustration of generating one or more transaction identifiers (XIDs) in a transactional middleware machine environment, in accordance with an embodiment of the invention. As shown in FIG. 9, a global transaction 910 in a transactional environment 900 can include a plurality of tightly-coupled branches, e.g. branches A-C 911-913.

Furthermore, the system can generate the transaction identifiers (XIDs), e.g. XIDs A-C 901-903 for the global transaction 910, and store them in a database 920. Each of the XIDs A-C 901-903 can include GTRID A 921 and FORMATID A 941, which function as the common global transaction identifier (GTRID) and a common format identifier (FORMATID) respectively. Thus, the database 920 can recognize that the branches A-C 911-913 belong to the same global transaction 910.

Additionally, each transaction identifiers (XIDs), e.g. XIDs A-C 901-903, can include a branch qualifier. For example, branch A 911 can include the branch qualifier, BQUAL A 931, while the transaction identifier (XID) B 902 can include a composite branch qualifier, BQUAL B' 932, and the transaction identifier (XID) C 903 can include a composite branch qualifier, BQUAL C' 933. BQUAL B' 932 and BQUAL C' 933 can include additional information for supporting the recovery of the global transaction 910, such as the local GTRID.

Figure 10:
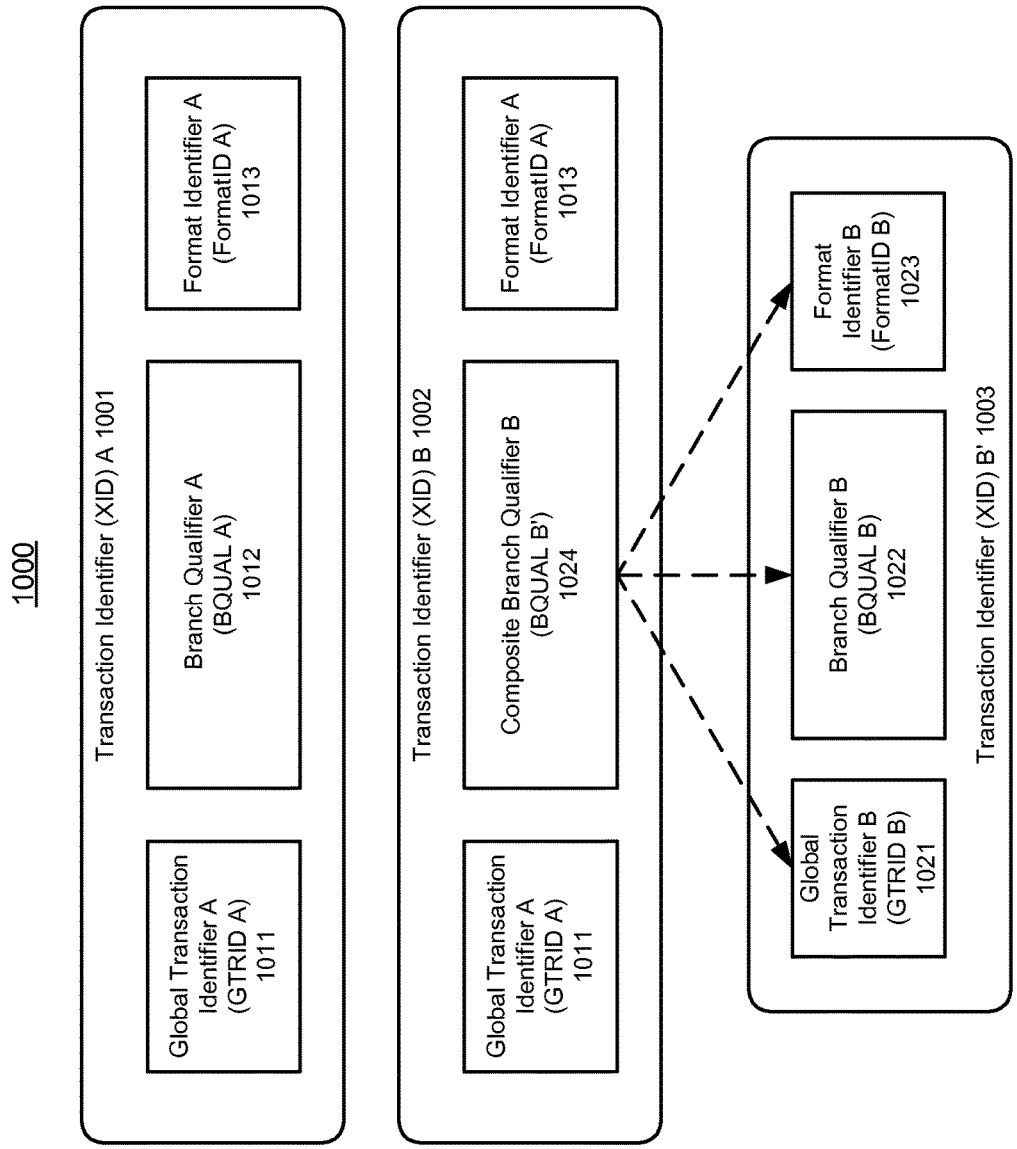
FIG. 10 shows an illustration of recovering a transaction in a transactional middleware machine environment, in accordance with an embodiment of the invention.

FIG. 10 shows an illustration of recovering a transaction in a transactional middleware machine environment, in accordance with an embodiment of the invention. As shown in FIG. 10, during the recover phase, a global transaction 1000 can be recovered based on one or more transaction identifier (XIDs), e.g. XIDs A-B 1001-1002.

The XID A 1001 is associated with the owner or initiator of the global transaction 1000. Thus, the GTRID A 1011, BQUAL A 1012, and FORMATID A 1013 can be retrieved directly from XID A 1001.

Furthermore, XID B 1002 can include the common GTRID A 1011, the common FORMATID A 1013, and a composite BQUAL B' 1024. As shown in FIG. 10, composite BQUAL B' 1024 includes the local GTRID B 1021, BQUAL B 1022, and FORMATID B 1023, each of which can be retrieved in order to recover the global transaction for the local branch.

Then, the transaction manager can continuingly process the global transaction 1000 using the local transaction IDs 1011-1013 and 1021-1023.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting application interoperability and recovery between different servers in a transactional middleware environment, the method comprising:

providing a connector in the transactional middleware environment, the connector being in operative communication with a transactional server that is associated with a first format identifier (FORMAT_ID_A), and the connector being in operative communication with an application server that is associated with a second format identifier (FORMAT_ID_B), the application server being different than the transactional server;

initiating a global transaction at the transactional server, wherein the global transaction comprises a plurality of branches respectively associated with a plurality of different transaction domains, and wherein the FORMAT_ID_A identifies the transactional server as the initiating server of the global transaction;

generating, by the transactional server, a first global transaction identifier (GTRID_A) that identifies the global transaction initiated at the transactional server, and wherein the GTRID_A is shared by each branch of the plurality of branches of the global transaction;

generating, by the transactional server, a first branch qualifier (BQUAL_A) that identifies a first branch of the global transaction;

generating, by the transactional server, a first local domain specific transaction identifier (XID_A) for the first branch of the global transaction, wherein the XID_A is local to a first transaction domain of the transactional server and has a first format comprising a Global Transaction Identifier field comprising the GTRID_A generated by the transactional server, a Branch Qualifier field comprising the BQUAL_A generated by the transactional server, and a Format Identifier field comprising the FORMAT_ID_A associated with the transactional server;

directing a second branch of the global transaction from the transactional server to the application server associated with the FORMAT_ID_B;

sending the FORMAT_ID_A from the transactional server to the connector;

receiving the FORMAT_ID_A by the connector as an imported format ID;

providing the imported format ID by the connector to the application server;

sending the GTRID_A by the transactional server to a first gateway server in the first transaction domain of the transactional server;

receiving the GTRID_A by the application server from a second gateway server in the second transaction domain of the application server;

generating, by the application server, a second local domain specific transaction identifier (XID_B) for the second branch of the global transaction, wherein the XID_B is local to the second transaction domain of the application server, the XID_B having the first format and comprising:

a Global Transaction Identifier field corresponding to the Global Transaction Identifier field of the XID_A, the Global Transaction Identifier field of the XID_B comprising the first global transaction identifier GTRID_A generated by the transactional server and received from the second gateway server;

a Branch Qualifier field corresponding to the Branch Qualifier field of the XID_A, the Branch Qualifier field of the XID_B comprising a composite branch qualifier (BQUAL_B'), the BQUAL_B' comprising, within the Branch Qualifier field of the XID_B:
   a second format identifier FORMAT_ID_B;
   a second branch qualifier (BQUAL_B) that that identifies the second branch of the global transaction; and
   a second global transaction identifier (GTRID_B) that identifies a portion of the global transaction initiated at the application server; and
a Format Identifier field corresponding to the Format Identifier field of the XID_A, the Format Identifier field of the XID_B comprising the first format identifier FORMAT_ID_A received by the connector as the imported format_ID;
interacting by the first branch of the global transaction executing in the first transaction domain on the transactional server with a database via an associated transaction manager using the XID_A comprising the GTRID_A, the FORMAT_ID_A, and the BQUAL_A; and
interacting by the second branch of the global transaction executing in the second transaction domain on the application server with the database via the associated transaction manager using the XID_B comprising the GTRID_A, the FORMAT_ID_A, and the BQUAL_B' including the BQUAL_B, the GTRID_B, and the FORMAT_ID_B,
wherein the associated transaction manager of the database can support the application interoperability by identifying a coupled relationship among the first branch of the global transaction executing in the first transaction domain and the second branch of the global transaction executing in the second transaction domain based on the GTRID_A received from the transactional server by the application server in the second transaction domain via the second gateway server and the FORMAT_ID_A provided from the transactional server to the application server in the second transaction domain by the connector, the GTRID A and the FORMAT_ID_A being included in both the XID_A and in the XID_B,
wherein the associated transaction manager of the database can support the application recovery by using the GTRID_B, the BQUAL_B, and the Format_ID_B local to the second transaction domain of the application server by retrieving the GTRID_B, the BQUAL_B, and the Format_ID_B from the BQUAL_B' of the XID_B.

2. The method of claim 1, wherein the sending the FORMAT_ID_A from the transactional server to the application server comprises:
   using the connector to receive the FORMAT_ID_A from a client of the transactional server invoking Tuxedo services; and
   providing the FORMAT_ID_A to the application server providing the Tuxedo services.

3. The method of claim 1, further comprising:
   associating the BQUAL_B' with the second branch of the global transaction by the application server, wherein the BQUAL_B' comprises the FORMAT_ID_B associated with the application server, the GTRID_B that identifies the global transaction owned by the application server, and the BQUAL_B that is associated with the second branch of the global transaction directed to the application server by the transactional server.

4. The method of claim 1, further comprising:
   using the connector to provide the interoperability between the transactional server and the application server, wherein the connector is selectively operable to:
   receive the FORMAT_ID_A from a Tuxedo client of the transactional server, and
   provide the FORMAT_ID_A to the application server to invoke WebLogic Server Enterprise Java Beans in response to a service request.

5. The method of claim 1, further comprising:
   storing the XID_A and the XID_B in a global transaction table in the database.

6. The method of claim 5, further comprising:
   retrieving, from the XID_B, the FORMAT_ID_B that is associated with the application server; and
   using the retrieved FORMAT_ID_B to recover the global transaction at the application server.

7. The method of claim 6, further comprising:
   continuing processing the global transaction using the retrieved FORMAT_ID_B.

8. The method of claim 1, further comprising:
   enabling read-only optimization in processing the global transaction.

9. A system for supporting interoperability and recovery of a global transaction across a plurality of different servers, the system comprising:
   one or more microprocessors;
   a transactional server running on the one or more microprocessors, the transactional server being associated with a first format identifier (FORMAT_ID_A);
   an application server running on the one or more microprocessors, the application server being associated with a second format identifier (FORMAT_ID_B), and the application server being different than the transactional server; and
   a connector running on the one or more microprocessors, the connector being in operative communication with the application server and transaction server with the transactional server,
   wherein the transactional server operates to:
      initiate a global transaction, wherein the global transaction comprises a plurality of branches respectively associated with a plurality of different transaction domains, and wherein the FORMAT_ID_A identifies the transactional server as the initiating server of the global transaction;
      generate a first global transaction identifier (GTRID_A) that identifies the global transaction initiated at the transactional server, and wherein the GTRID_A is shared by each branch of the plurality of branches of the global transaction;
      generate a first branch qualifier (BQUAL_A) that identifies a first branch of the global transaction;
      generate a first local domain specific transaction identifier (XID_A) for the first branch of the global transaction, wherein the XID_A is local to a first transaction domain of the transactional server, and wherein the XID_A has a first format comprising a Global Transaction Identifier field comprising the GTRID_A generated by the transactional server, a Branch Qualifier field comprising the BQUAL_A generated by the transactional server, and a Format Identifier field comprising the FORMAT_ID_A associated with the transactional server;
      direct a second branch of the global transaction from the transactional server to the application associated with the FORMAT_ID_B;

send the GTRID_A to a first gateway server in the first transaction domain of the transactional domain; and
send the FORMAT_ID_A from the transactional server to the connector;
wherein the connector operates to:
receive the FORMAT_ID_A as an imported format_ID; and
provide the imported format_ID to the application server;
wherein the application server operates to:
receive the GTRID_A from a second gateway server in the second transaction domain of the application server;
generate a second local domain specific transaction identifier (XID_B) for the second branch of the global transaction, wherein the XID_B is local to the second transaction domain of the application server, the XID_B comprising:
a Global Transaction Identifier field corresponding to the Global Transaction Identifier field of the XID_A, the Global Transaction Identifier field of the XID_B comprising the first global transaction identifier GTRID_A generated by the transactional server and received from the second gateway server;
a Branch Qualifier field corresponding to the Branch Qualifier field of the XID_A, the Branch Qualifier field of the XID_B comprising a composite branch qualifier (BQUAL_B'), the BQUAL_B' comprising, within the Branch Qualifier field of the XID_B:
a second format identifier FORMAT_ID_B;
a second branch qualifier (BQUAL_B) that that identifies the second branch of the global transaction; and
a second global transaction identifier (GTRID_B) that identifies a portion of the global transaction initiated at the application server; and
a Format Identifier field corresponding to the Format Identifier field of the XID_A, the Format Identifier field of the XID_B comprising the first format identifier FORMAT_ID_A received by the connector as the imported format_ID;
wherein the transactional server operates to cause the first branch of the global transaction executing in the first transaction domain on the transactional server to interact with a database via an associated transaction manager using the XID_A comprising the GTRID_A, the FORMAT_ID_A, and the BQUAL_A;
wherein the application server operates to cause the second branch of the global transaction executing in the second transaction domain on the application server to interact with the database via the associated transaction manager using the XID_B comprising the GTRID_A, the FORMAT_ID_A, and the BQUAL_B' including the BQUAL_B, the GTRID_B, and the FORMAT_ID_B,
wherein the associated transaction manager of the database can support the application interoperability by identifying a coupled relationship among the first branch of the global transaction executing in the first transaction domain and the second branch of the global transaction executing in the second transaction domain based on the GTRID_A received from the transactional server by the application server in the second transaction domain via the second gateway server and the FORMAT_ID_A provided from the transactional server to the application server in the second transaction domain by the connector, the GTRID_A and the FORMAT_ID_A being included in both the XID_A and in the XID_B,
wherein the associated transaction manager of the database can support the application recovery by using the GTRID_B, the BQUAL_B, and the Format_ID_B local to the second transaction domain of the application server by retrieving the GTRID_B, the BQUAL_B, and the Format_ID_B from the BQUAL_B' of the XID_B.

10. The system of claim 9, wherein the sending the FORMAT_ID_A from the transactional server to the application server comprises:
using the connector to receive the FORMAT_ID_A from a client of the transactional server invoking Tuxedo services; and
providing the FORMAT_ID_A to the application server providing the Tuxedo services.

11. The system of claim 9, wherein:
the BQUAL_B' is associated with the second branch of the global transaction by the application server,
the BQUAL_B' comprises the FORMAT_ID_B associated with the application server, the GTRID_B that identifies the global transaction owned by the application server, and the BQUAL_B that is associated with the second branch of the global transaction directed to the application server by the transactional server.

12. The system of claim 9, wherein:
the connector is operable to provide the interoperability between the transactional server and the application server, wherein the connector is selectively operable to:
receive the FORMAT_ID_A from a Tuxedo client of the transactional server, and
provide the FORMAT_ID_A to the application server to invoke WebLogic Server Enterprise Java Beans in response to a service request.

13. The system of claim 9, wherein:
the XID_A and the XID_B are stored in a global transaction table in the database.

14. The system of claim 13, wherein:
the application server operates to retrieve, from the XID_B, the FORMAT_ID_B that is associated with the application server; and
the retrieved FORMAT_ID_B is used to recover the global transaction at the application server.

15. The system of claim 14, wherein:
the application server operates to continue processing the global transaction using the retrieved FORMAT_ID_B.

16. A non-transitory machine readable storage medium having instructions stored thereon that when executed cause a system to perform steps for supporting application interoperability and recovery between different servers in a transactional middleware environment, the steps comprising:
providing a connector in the transactional middleware environment, the connector being in operative communication with a transactional server that is associated with a first format identifier (FORMAT_ID_A), and the connector being in operative communication with an application server that is associated with a second format identifier (FORMAT_ID_B), the application server being different than the transactional server;
initiating a global transaction at the transactional server, wherein the global transaction comprises a plurality of branches respectively associated with a plurality of different transaction domains, and wherein the FORMAT_ID_A identifies the transactional server as the initiating server of the global transaction;

generating, by the transactional server, a first global transaction identifier (GTRID_A) that identifies the global transaction initiated at the transactional server, and wherein the GTRID_A is shared by each branch of the plurality of branches of the global transaction;

generating, by the transactional server, a first branch qualifier (BQUAL_A) that identifies a first branch of the global transaction;

generating, by the transactional server, a first local domain specific transaction identifier (XID_A) for the first branch of the global transaction, wherein the XID_A is local to a first transaction domain of the transactional server and has a first format comprising a Global Transaction Identifier field comprising the GTRID_A generated by the transactional server, a Branch Qualifier field comprising the BQUAL_A generated by the transactional server, and a Format Identifier field comprising the FORMAT_ID_A associated with the transactional server;

directing a second branch of the global transaction from the transactional server to the application server associated with the FORMAT_ID_B;

sending the FORMAT_ID_A from the transactional server to the connector;

receiving the FORMAT_ID_A by the connector as an imported format_ID;

providing the imported format_ID by the connector to the application server;

sending the GTRID_A by the transactional server to a first gateway server in the first transaction domain of the transactional server;

receiving the GTRID_A by the application server from a second gateway server in the second transaction domain of the application server;

generating, by the application server, a second local domain specific transaction identifier (XID_B) for the second branch of the global transaction, wherein the XID_B is local to the second transaction domain of the application server, the XID_B having the first format and comprising:
- a Global Transaction Identifier field corresponding to the Global Transaction Identifier field of the XID_A, the Global Transaction Identifier field of the XID_B comprising the first global transaction identifier GTRID_A generated by the transactional server and received from the second gateway server;
- a Branch Qualifier field corresponding to the Branch Qualifier field of the XID_A, the Branch Qualifier field of the XID_B comprising a composite branch qualifier (BQUAL_B'), the BQUAL B' comprising:
  - a second format identifier FORMAT_ID_B;
  - a second branch qualifier (BQUAL_B) that that identifies the second branch of the global transaction; and
  - a second global transaction identifier (GTRID_B) that identifies a portion of the global transaction initiated at the application server; and
- a Format Identifier field corresponding to the Format Identifier field of the XID_A, the Format Identifier field of the XID_B comprising the first format identifier FORMAT_ID_A received by the connector as the imported format_ID;

interacting by the first branch of the global transaction executing in the first transaction domain on the transactional server with a database via an associated transaction manager using the XID_A comprising the GTRID_A, the FORMAT_ID_A, and the BQUAL_A; and interacting by the second branch of the global transaction executing in the second transaction domain on the application server with the database via the associated transaction manager using the XID_B comprising the GTRID_A, the FORMAT_ID_A, and the BQUAL_B' including the BQUAL_B, the GTRID_B, and the FORMAT_ID_B, wherein the associated transaction manager of the database can support the application interoperability by identifying a coupled relationship among the first branch of the global transaction executing in the first transaction domain and the second branch of the global transaction executing in the second transaction domain based on the GTRID_A received from the transactional server by the application server in the second transaction domain via the second gateway server and the FORMAT_ID_A provided from the transactional server to the application server in the second transaction domain by the connector, the GTRID_A and the FORMAT_ID_A being included in both the XID_A and in the XID_B, wherein the associated transaction manager of the database can support the application recovery by using the GTRID_B, the BQUAL_B, and the Format_ID_B local to the second transaction domain of the application server by retrieving the GTRID_B, the BQUAL_B, and the Format_ID_B from the BQUAL_B' of the XID_B.

* * * * *

UNITED STATES PATENT AND TRADEMARK OFFICE
CERTIFICATE OF CORRECTION

PATENT NO. : 10,133,596 B2
APPLICATION NO. : 13/829246
DATED : November 20, 2018
INVENTOR(S) : Shen et al.

It is certified that error appears in the above-identified patent and that said Letters Patent is hereby corrected as shown below:

In the Drawings

On sheet 4 of 10, in FIGURE 4, under Reference Numeral 403, Line 1, delete "branch,which" and insert -- branch, which --, therefor.

On sheet 6 of 10, in FIGURE 6, under Reference Numeral 601, Line 2, delete "wth" and insert -- with --, therefor.

In the Specification

In Column 5, Line 3, after "303" insert -- . --.

In Column 7, Line 39, after "branch" insert -- . --.

In Column 9, Line 57, after "data" insert -- . --.

In the Claims

In Column 11, Line 7, in Claim 1, delete "that that" and insert -- that --, therefor.

In Column 12, Line 38, in Claim 9, after "server and" delete "transaction server".

In Column 13, Line 33, in Claim 9, delete "that that" and insert -- that --, therefor.

In Column 16, Line 4, in Claim 16, delete "that that" and insert -- that --, therefor.

Signed and Sealed this
Twenty-ninth Day of October, 2019

Andrei Iancu
*Director of the United States Patent and Trademark Office*